(12) United States Patent
Perez Barrera et al.

(10) Patent No.: US 10,629,079 B2
(45) Date of Patent: Apr. 21, 2020

(54) VEHICLE COLLISION AVOIDANCE

(71) Applicant: Ford Global Technologies, LLC, Dearborn, MI (US)

(72) Inventors: Oswaldo Perez Barrera, Texcoco (MX); Alvaro Jimenez Hernandez, Miguel Hidalgo (MX)

(73) Assignee: Ford Global Technologies, LLC, Dearborn, MI (US)

( * ) Notice: Subject to any disclaimer, the term of this patent is extended or adjusted under 35 U.S.C. 154(b) by 524 days.

(21) Appl. No.: 15/368,926

(22) Filed: Dec. 5, 2016

(65) Prior Publication Data
US 2018/0158334 A1     Jun. 7, 2018

(51) Int. Cl.
| | |
|---|---|
| *G08G 1/16* | (2006.01) |
| *B60W 30/09* | (2012.01) |
| *B62D 15/02* | (2006.01) |
| *B60W 30/165* | (2020.01) |
| *B60W 30/095* | (2012.01) |
| *B60Q 9/00* | (2006.01) |
| *B60R 1/00* | (2006.01) |
| *B62D 6/00* | (2006.01) |
| *G01S 19/01* | (2010.01) |
| *G05D 1/02* | (2020.01) |

(Continued)

(52) U.S. Cl.
CPC ............... *G08G 1/16* (2013.01); *B60Q 9/008* (2013.01); *B60R 1/00* (2013.01); *B60W 30/09* (2013.01); *B60W 30/0956* (2013.01); *B60W 30/165* (2013.01); *B62D 6/001* (2013.01); *B62D 15/0265* (2013.01); *G01S 19/01* (2013.01); *G05D 1/0253* (2013.01); *G06K 9/00805* (2013.01); *G06K 9/4609* (2013.01);

*G08G 1/165* (2013.01); *G08G 1/166* (2013.01); *G08G 1/167* (2013.01); *B60R 2300/804* (2013.01); *B60R 2300/8093* (2013.01); *B60W 2550/14* (2013.01); *B60W 2550/306* (2013.01); *G05D 2201/0213* (2013.01)

(58) Field of Classification Search
None
See application file for complete search history.

(56) References Cited

U.S. PATENT DOCUMENTS

| | | |
|---|---|---|
| 6,026,347 A | 2/2000 | Schuster |
| 8,139,109 B2 | 3/2012 | Schmiedel et al. |
| 8,473,144 B1 | 6/2013 | Dolgov et al. |

(Continued)

FOREIGN PATENT DOCUMENTS

JP      5110437 B2     10/2012

OTHER PUBLICATIONS

Du, Yue, "Real-Time Vehicle Following through a Novel Symmetry-Based Approach," Proceedings of the 1997 IEEE International Conference on Robotics and Automation, Apr. 1997.

*Primary Examiner* — Abby Y Lin
*Assistant Examiner* — Edward Torchinsky
(74) *Attorney, Agent, or Firm* — Frank A. MacKenzie; Bejin Bieneman PLC

(57) ABSTRACT

A computer, programmed to: receive image data from a vehicle sensor; associate a plurality of geometric shapes with the image data of a target vehicle; monitor the plurality of geometric shapes for a condition indicative of the target vehicle moving to avoid a roadway obstacle; and in response to the condition, provide a steering instruction to avoid the obstacle.

18 Claims, 5 Drawing Sheets

(51) Int. Cl.
*G06K 9/00* (2006.01)
*G06K 9/46* (2006.01)

(56) References Cited

U.S. PATENT DOCUMENTS

| | | | |
|---|---|---|---|
| 8,749,631 B2* | 6/2014 | Saito | G06K 9/00805 |
| | | | 348/143 |
| 9,061,590 B2* | 6/2015 | Kurumisawa | B60K 31/00 |
| 9,150,220 B2* | 10/2015 | Clarke | B60W 30/00 |
| 9,381,919 B2 | 7/2016 | Gerdt | |
| 9,466,215 B2* | 10/2016 | Luo | G08G 1/166 |
| 9,607,228 B2* | 3/2017 | Mei | G06K 9/00805 |
| 9,958,260 B2* | 5/2018 | Yoo | G01B 11/14 |
| 10,081,308 B2* | 9/2018 | Kuehnle | G06T 7/73 |
| 2008/0273752 A1* | 11/2008 | Zhu | B60W 40/02 |
| | | | 382/103 |
| 2009/0262188 A1* | 10/2009 | Hoki | G06K 9/3233 |
| | | | 348/140 |
| 2012/0242799 A1* | 9/2012 | Saito | G01S 7/4802 |
| | | | 348/46 |
| 2014/0350815 A1* | 11/2014 | Kambe | B60T 7/22 |
| | | | 701/70 |
| 2016/0375904 A1* | 12/2016 | Satzoda | B60W 30/0956 |
| | | | 348/148 |
| 2017/0371347 A1* | 12/2017 | Cohen | G06T 7/20 |
| 2018/0134287 A1* | 5/2018 | Fendt | B60W 30/0956 |

* cited by examiner

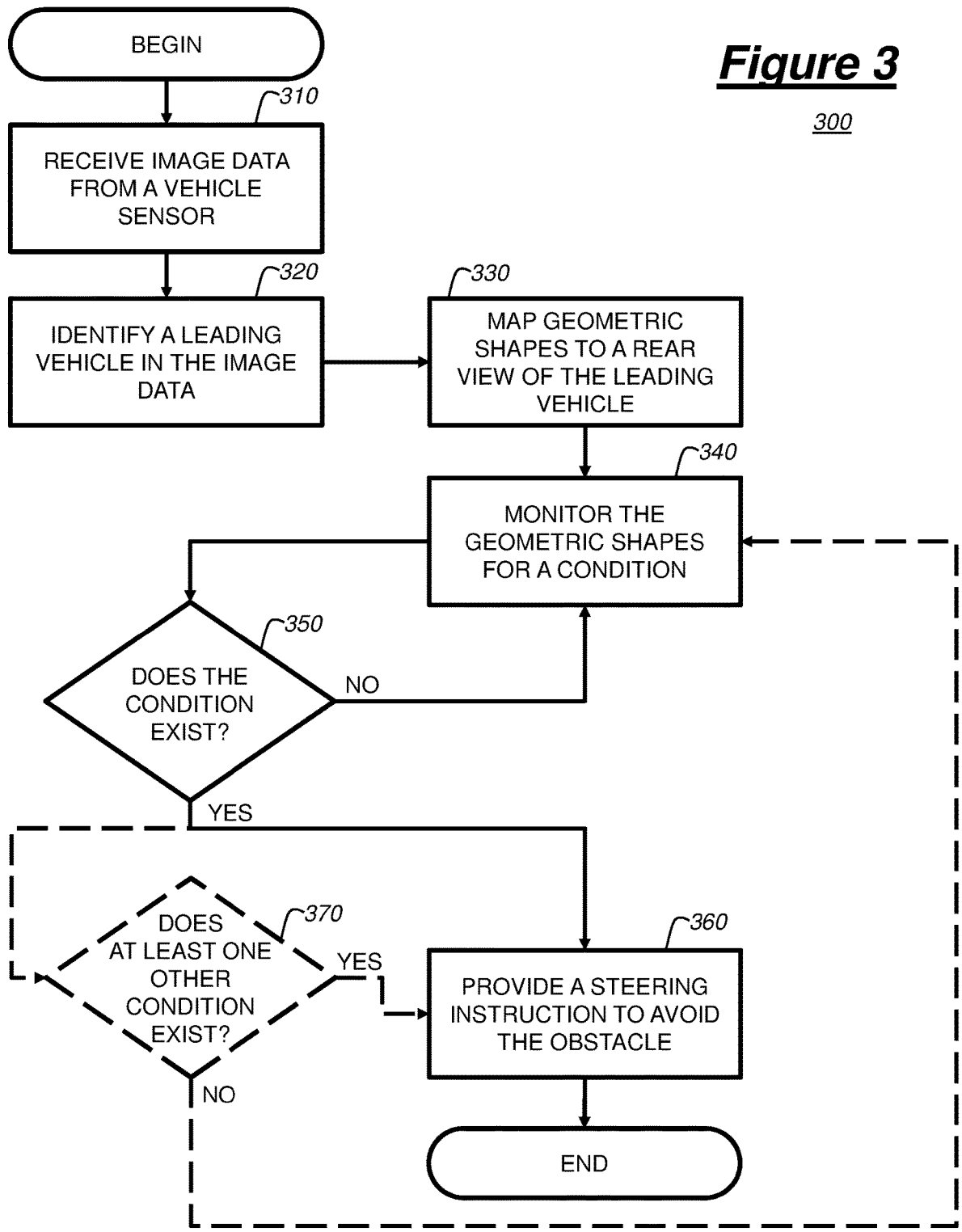

VEHICLE COLLISION AVOIDANCE

BACKGROUND

Using vehicle sensors, modern vehicles may detect roadway obstacles—such as pedestrians, potholes, objects fallen from another vehicle, etc. For example, an onboard vehicle computer may be configured to receive sensor input and, in response, control vehicle steering systems, braking systems, etc. to avoid contact or collision with such obstacles. Collision avoidance becomes increasingly difficult in situations with less response time—i.e., less time to detect the obstacle and less time for computer processing. For example, consider a first vehicle that follows a second vehicle; the first vehicle may have limited line of sight and be unable to detect an obstacle in front of the second vehicle. And if the second vehicle suddenly swerves to avoid the obstacle, the first vehicle may have insufficient time to avoid a collision therewith.

BRIEF DESCRIPTION OF THE DRAWINGS

FIG. 3 is a flow diagram of an illustrative process of providing a steering instruction to avoid a roadway obstacle.

DETAILED DESCRIPTION

Figure 1:
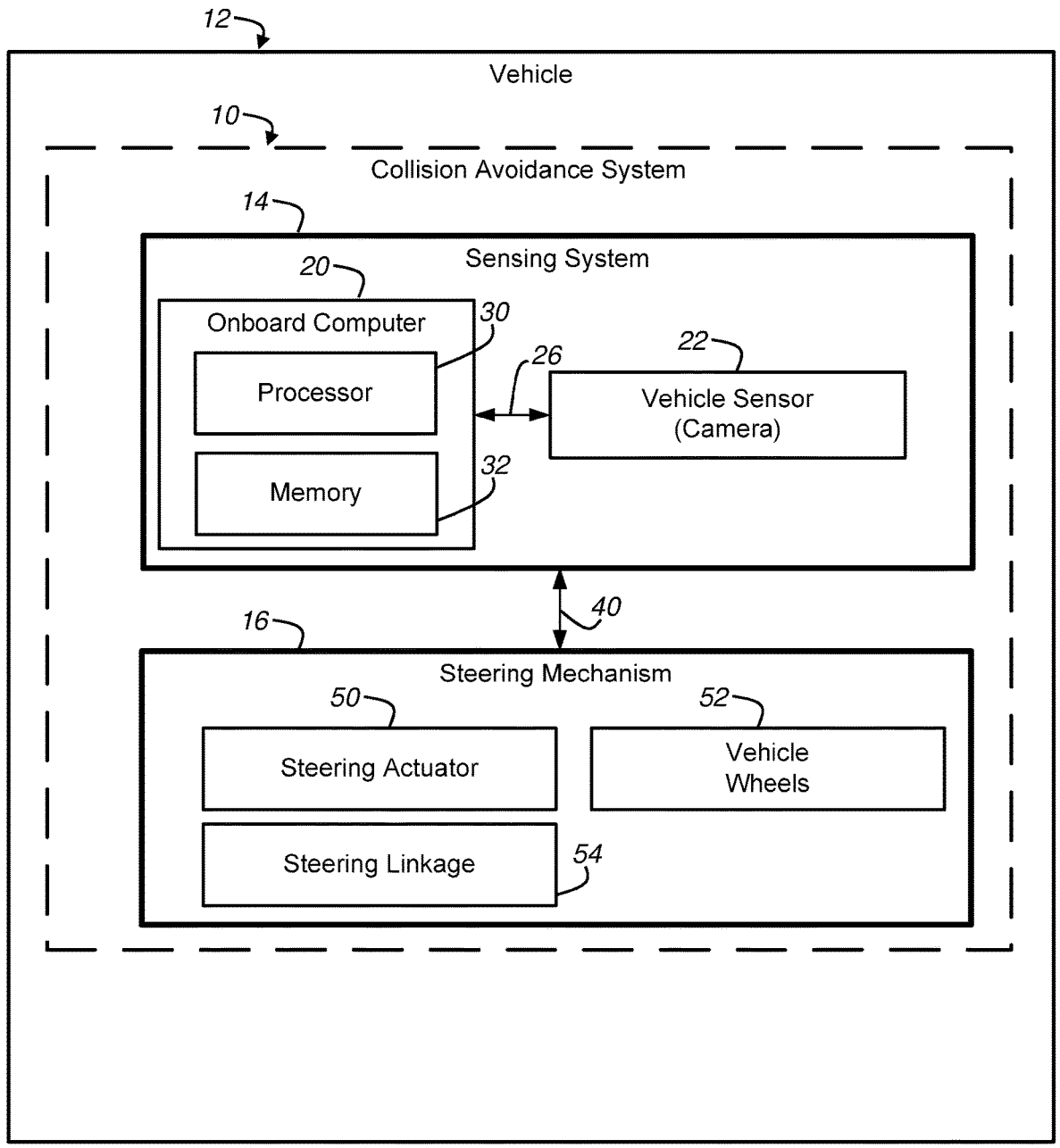
FIG. 1 is a schematic diagram of an exemplary vehicle including a collision avoidance system.

An obstacle or collision avoidance system 10 for a vehicle 12 includes a sensing system 14 and a steering system 16 that is responsive to an input from the sensing system 14. In general, the vehicle 12 may be programmed to operate in an autonomous or self-driving mode. An onboard vehicle computer 20 in the sensing system 14 may be programmed to receive image data from an onboard vehicle sensor 22, identify a target or leading vehicle using the image data, and associate one or more geometric shapes with the leading vehicle. Thereafter, the computer 20 may monitor the associated geometric shapes for a condition that is indicative of the leading vehicle moving to avoid a roadway obstacle (e.g., swerving or the like). When the computer 20 determines that the condition exists, it may provide an output to the vehicle steering system 16 so that the vehicle 12 may move to avoid the obstacle. More particularly, the vehicle 12 may follow the movement or path of the leading vehicle to avoid collision with the obstacle; e.g., the computer 20 may be configured or programmed to instruct the vehicle 12 follow the leading vehicle in certain circumstances independent of any detection and processing by the computer 20 of the obstacle itself.

The vehicle 12 (FIGS. 1-2) may be a passenger car or any other suitable vehicle. For example, vehicle may be a motorcycle, truck, sports utility vehicle (SUV), recreational vehicle, marine vessel, aircraft, or the like that includes sensing system 14 and steering system 16. The vehicle 12 may be operated autonomously or semi-autonomously. Under autonomous operation, sometimes referred to as "fully autonomous," the vehicle 12 computer 20 controls each of vehicle 12 propulsion (e.g., a powertrain including an internal combustion engine and/or electric motor), braking, and steering. Semi-autonomous means that the computer 20 controls at least one of propulsion, braking, and steering.

As shown in FIG. 1, vehicle sensing system 14 includes the onboard vehicle computer 20 and the onboard vehicle sensor 22 coupled to one another via a communication link 26. The onboard computer 20 may be a modular device or computer module that can be embedded within vehicle 12 during vehicle manufacturing or installed as an aftermarket module. Or in some implementations, computer 20 may be integrated with other existing vehicle system or subsystem modules.

The onboard computer 20 includes a processor or processing circuit 30 coupled to memory 32. For example, processor 30 can be any type of device capable of processing electronic instructions, non-limiting examples including a microprocessor, a microcontroller or controller, an application specific integrated circuit (ASIC), etc.—just to name a few. Processor 30 may be dedicated to computer 20, or it may be shared with other vehicle systems and/or subsystems. As will be apparent from the description which follows, onboard computer 20 may be programmed to carry out at least a portion of the process described herein. For example, processor 30 can be configured to execute digitally-stored instructions, which may be stored in memory 32, which enable the computer 20, among other things, to receive image data from sensor 22 and determine whether to follow a leading vehicle in order to avoid collisions with roadway obstacles and the like.

Memory 32 may include any non-transitory computer usable or readable medium, which may include one or more storage devices or articles. Exemplary non-transitory computer usable storage devices include conventional computer system RAM (random access memory), ROM (read only memory), EPROM (erasable, programmable ROM), EEPROM (electrically erasable, programmable ROM), as well as any other volatile or non-volatile media. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read. As discussed above, memory 32 may store one or more computer program products which may be embodied as software, firmware, or the like.

In at least one example, memory 32 stores instructions executable by processor 30 to carry out blocks of the process described below. For example, computer-executable instructions may be compiled or interpreted from computer programs created using a variety of programming languages and/or technologies, including, without limitation, and either alone or in combination, Java™, C, C++, Visual Basic, Java Script, Perl, HTML, etc. Memory 32 also may store data in the form of files. A file in the computing device is generally a collection of data stored on a computer readable medium, such as a storage medium, a random access memory, etc.

Vehicle sensor 22 may include any suitable modular device for sensing the vehicle's environment, as well as objects within that environment. According to one non-limiting example, the sensor 22 is an imaging device (e.g., a charge-coupled device (CCD), a complementary metal-oxide semiconductor (CMOS), a charge injection device (CID), a light detection and ranging (LIDAR) device, or other imaging devices also known in the art). Of course, these are merely examples and other implementations are also possible. In addition, sensor 22 could be a so-called sensor array or the like comprising multiple sensor devices.

Figure 2:
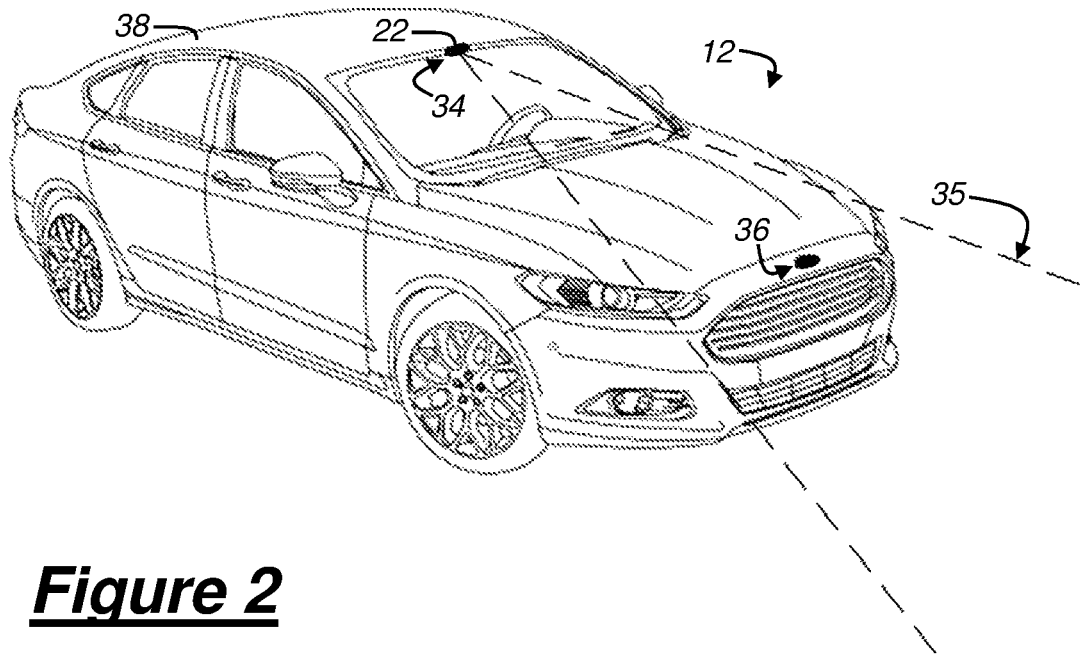
FIG. 2 is a perspective view of the vehicle shown in FIG. 1 illustrating a field of view of a vehicle sensor.

FIG. 2 illustrates the sensor 22 mounted in a first position 34 (e.g., centered above a vehicle windshield, near) having a forward-looking field of view 35. Position 34 is merely one example; e.g., sensor 22 also could be positioned in other areas of the vehicle 12 which provide at least a partial forward-looking field of view—e.g., such as at a second position 36 (such as on or proximate to a vehicle grill or the like). Still other locations are contemplated. In addition, while the sensor positions 34, 36 may be centered along a longitudinally-extending vertical plane (not shown) of vehicle 12, this is not required. And in at least one example, the sensor 22 is integrated or embedded within a body 38 of the vehicle (e.g., having only a lens or aperture visible from an exterior of the vehicle 12).

In at least one implementation, a primary function of sensor 22 may be to provide image data for operating vehicle 12 in an autonomous mode or partially autonomous mode e.g., image data being used to operate a lane-departure warning system in vehicle 12, to operate a parking assistance system, to operate a cross-traffic alert system, or the like. Thus, in at least one example, sensor 22 is primarily used by other vehicle systems. The sensor 22 also may be used with the sensing system 14 as the vehicle operates using an autonomous steering mode. As used herein, an autonomous steering mode is a mode wherein a computer (e.g., such as computer 20) controls or at least partially controls the movement of vehicle 12 (e.g., its direction and/or speed). Thus, in this autonomous steering mode, a driver of vehicle 12 may not provide any steering input (e.g., computer 20 or other suitable computers may control all aspects of vehicle steering and/or movement), or computer 20 may assume temporary control of the steering and/or movement of the vehicle 12—e.g., as vehicle 12 moves suddenly to avoid a roadway obstacle, as described in the process below. In at least one example, computer 20 may control other aspects of vehicle movement in the autonomous steering mode—e.g., decelerating or accelerating while controlling steering of the vehicle 12.

Figure 9:
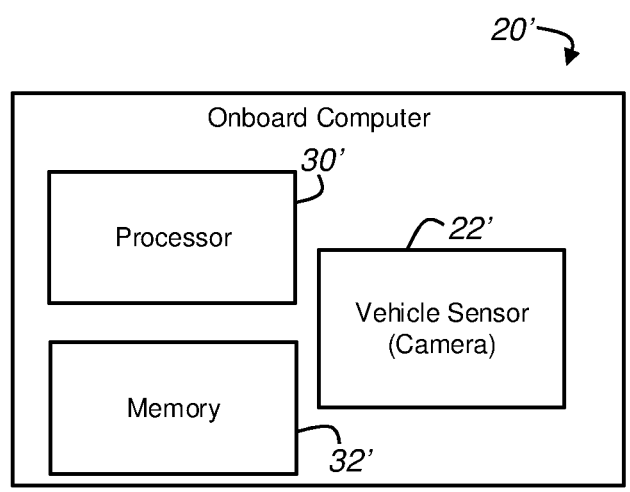
FIG. 9 is an alternative example of an onboard vehicle computer.

While the sensor 22 and computer 20 have been described as separate devices, this of course is merely exemplary. For example, in at least one alternative example (FIG. 9), the computer 20' and at least one sensor 22' are carried within the same module (here, like reference numerals indicate identical or similar features and/or functions).

Returning to FIG. 1, the communication link 26 between the computer 20 and sensor 22 may be embodied as any suitable wired or wireless connection or computer network. Non-limiting wired implementations include a communication bus (e.g., implementing a controller area network or the like), discrete electrical wiring, discrete optical harnesses, etc. (e.g., comprised of metal wire, fiber optic cable, or the like). In wireless implementations, computer 20 and sensor 22 may comprise transmitters, receivers, or both to facilitate transmitting and/or receiving data according to any suitable short range wireless communication protocol (e.g., such as Bluetooth, BLE, Wi-Fi, etc.). Other communication links—e.g., a link 40 between the sensing system 14 and the steering system 16—may be identical to (or have similar features as) link 26. Further, while not illustrated in FIG. 1, it will be appreciated that processor 30 and memory 32 are coupled to another and may be coupled to other circuit device or elements (not shown).

Turning now to steering system 16 (FIG. 1), the system 16 may include a steering actuator 50 and vehicle wheels 52. The steering actuator 50 may be adapted to receive a mechanical input, an electrical input, or both, and in response to the input(s), the actuator 50 may be configured to provide a corresponding output that moves the vehicle wheels 52. The system 16 may be operable using or not using the autonomous steering mode. Non-limiting examples of actuators 50 include a steering wheel, electric motors, etc. In some implementations, a mechanical steering linkage 54 may couple the actuator 50 to the wheels 52 (e.g., as in a rack and pinion arrangement). Or for example, in drive-by-wire examples, the linkage 54 may be an electrical coupling between a controller (e.g., the actuator 50) and one or more motors and gears which turn the vehicle wheels 52. In at least one example, the actuator 50 may communicate with the onboard computer 20 (e.g., and receive an instruction to control vehicle steering, vehicle speed, vehicle braking, or the like). In at least one example, the instruction is embodied as an electrical or optical signal; however, this is merely an example and other wired and wireless examples also exist. Other aspects of the steering system 16, its assembly and construction, and the techniques for controlling it will be appreciated by skilled artisans.

In the description which follows, the vehicle 12 is referred to as a first or 'object vehicle'—i.e., the vehicle taking action to follow a second vehicle (e.g., a leading vehicle or a vehicle at least partially in front of the object vehicle 12) to avoid a collision with a roadway object or obstacle. As will be discussed below, the onboard computer 20 of sensing system 14 may be programmed with a set of instructions to receive image data or image frames (e.g., video data or video frames, other suitable data or data frames, etc.) from the vehicle sensor 22, identify a leading vehicle from the image data, map one or more geometric images or shapes to the imaged leading vehicle, and monitor leading vehicle behavior by monitoring the geometric shape(s). In this manner, at least some detection and processing time associated with monitoring the leading vehicle may be minimized—e.g., as the computer 20 may monitor or track geometric patterns, rather than monitoring a relatively complex image (of the leading vehicle). For example, monitoring geometric shapes may reduce or minimize processing associated with vehicle color(s), background color(s), color changes and/or brightness or intensity changes (e.g., due to the leading vehicle passing through shadows, changes in weather (cloud cover, rain, etc.), and the like.

Thus, as explained further below, the computer 20 may execute instructions that determine when a leading vehicle moves or swerves to avoid contact with a roadway obstacle. And in response to such a determination, the processor 30 of computer 20 may provide a command or control instruction that triggers an actuation of the steering system 16 so that the object vehicle 12 follows the leading vehicle and similarly moves to avoid contact with the obstacle.

FIG. 3 depicts an illustrative process 300 of providing a steering instruction while the object vehicle 12 is operating in an autonomous steering mode. The process 300 may begin with block 310, wherein the onboard computer 20 receives image data from the sensor 22 (e.g., in this implementation, a CCD camera) via the communication link 26 (e.g., in this implementation, a data bus). Block 310 may occur continuously or intermittently during the remainder of process 300. As used herein, the image data comprises information captured within one or more digital frames; e.g., image data may include consecutive or sequential digital frames (e.g., according to a sensing or sampling rate) that embody video or streaming data. Thus, some image data may be transmitted to the onboard computer 20 while the sensor 22 may be converting or digitizing additionally received or captured image data. The information may include analog data, digital data, or a combination thereof; e.g., the information may be comprised of an array of pixel data or the like.

Figure 4:
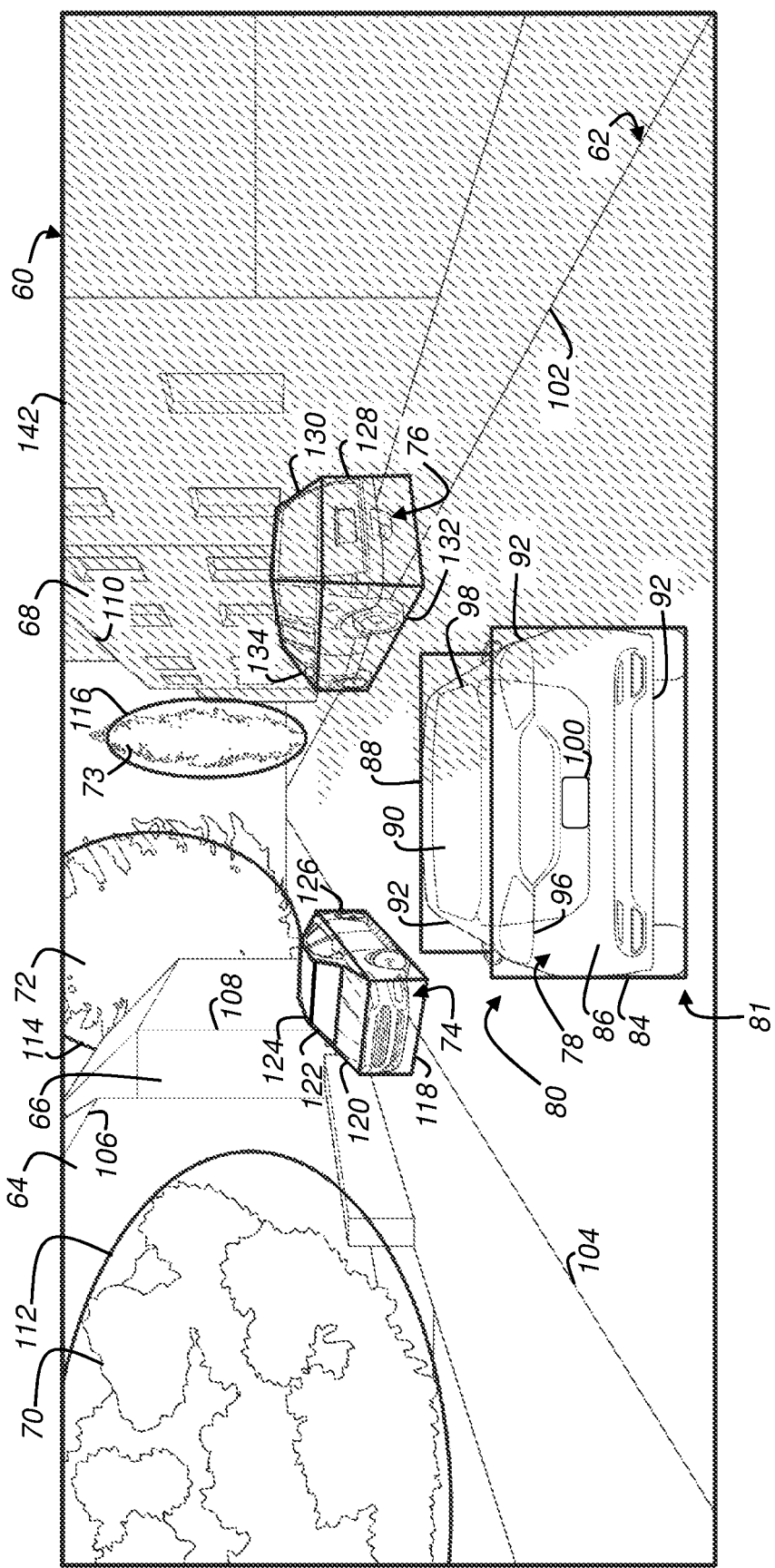
FIG. 4 is an exemplary digital frame captured by the vehicle sensor shown in FIG. 2.

FIGS. 4-8 depict exemplary roadway scenarios described in process 300. FIG. 4 illustrates an exemplary digital frame 60 captured by the forward-looking vehicle sensor 22 (of the object vehicle 12). For example, within the frame 60, the image data includes a roadway 62, a number of buildings 64-68, a number of trees or bushes 70-73, two parked vehicles 74-76, and a rear end 78 of a leading vehicle 80. In block 320 which follows block 310, the onboard computer 20 (more specifically, the processor 30) identifies the leading vehicle 80—e.g., which may be located at least partially in front of the object vehicle 12. The leading vehicle 80 may be identified using one or more object recognition techniques and one or more object recognition algorithms stored in memory 32 and executable by processor 30. For example, the processor 30 may compare a rear view 81 of the leading vehicle 80 to a catalogue of different vehicle images stored in memory 32 and determine or identify the leading vehicle 80 based upon the comparison (e.g., a matching algorithm). Or the processor 30 may identify the leading vehicle 80 by identifying one or more features of the leading vehicle 80 (e.g., tires, a windshield, indicator lamps, a license plate 100, etc.) (e.g., a feature recognition algorithm). These algorithms are merely examples; other suitable techniques also may be used to identify the leading vehicle 80 from other information within the image data. In at least one example, processor 30 identifies at least the rear end 78 of vehicle 80.

Once the leading vehicle 80 is identified, the processor 30 may associate one or more geometric shapes with the leading vehicle 80. For example, FIG. 4 illustrates a first geometric shape 84 (e.g., a rectangle) mapped to a lower rear portion 86 of the leading vehicle 80, and a second geometric shape 88 (e.g., another rectangle) is mapped to an upper rear portion 90 thereof. According to one example, at least a portion of each of the geometric shapes 84, 88 may be mapped to overlay a peripheral outline 92 of the rear view 81 of the leading vehicle 80. According to other examples, any features viewable from the forward-looking sensor 22 may be mapped; e.g., outlining all or a portion of one or more of the rear indicator lamps 96, a rear window 98, license plate 100, etc.

Further, the illustrated rectangular shapes 84, 88 and the quantity thereof are exemplary. For example, a single geometric shape may be used; or more than two geometric shapes could be used. Non-limiting examples of suitable geometric shapes include rectangles, ellipses, triangles, trapezoids, and other polygons. According to at least one example, the mapping of two or more geometric shapes to leading vehicle 80 may provide redundancy and avoid computational confusion with information pertaining to other environmental objects (64-76) which may be mapped in a similar manner. For example, FIG. 4 illustrates numerous other geometric shapes: geometric shapes 102, 104 (e.g., converging lines) that define roadway 62; geometric shapes 106, 108, 110 associated with (e.g. mapped to) buildings 64, 66, 68, respectively; geometric shapes 112, 114, 116 mapped to trees and bushes 70, 72, 73 respectively; geometric shapes 118, 120, 122, 124, 126 mapped to parked vehicle 74; and geometric shapes 128, 130, 132, 134 mapped to parked vehicle 76. Thus, to avoid confusion with the numerous other geometric shapes that may be associated with other information within each digital frame 60, in some implementations it may be desirable to use at least two geometric shapes 84, 88 which are expected to move concurrently within the sensor's field of view 35 for leading vehicle 80. For example, using two geometric shapes, a rear side of the leading vehicle 80 may be distinguished from a front side of another vehicle. For example, in at least one example, it may be more difficult for processor 30 to distinguish between the front end and rear end 78 of the leading vehicle 80 if a single shape (e.g., a single rectangle) were used in both instances. In addition, for example, note that multiple mapped geometric shapes 118-126 at least partially define a front view of parked vehicle 74; further, these shapes have perspective (e.g., in accordance with a vanishing point (not shown) in FIG. 4). However, the two geometric shapes 84, 88 which are mapped to leading vehicle 80 may not be affected by perspective (e.g., because the vehicle 80 is nearly directly in front of object vehicle 12)—consequently enabling object vehicle 12 to better detect and follow the rear end 78 of leading vehicle 80, as described more below.

As used herein, the term mapping includes using the processor 30 to associate one or more predetermined geometric shapes (e.g., such as one or more rectangles, ellipses, triangles, trapezoids, or other polygons) with one or more features at the rear end 78 of the leading vehicle 80 and, in response to the association, then assign the one or more predetermined geometric shapes to those portion(s). The one or more features are not required to define the peripheral outline 92 of vehicle 80; however, in at least one example, the predetermined geometric shapes collectively overlay at least 25% of the outline 92.

Geometric shapes (e.g., 84, 88) could be used in other ways as well. For example, one or more geometric shapes may be used that entirely encloses or circumscribes the peripheral outline 92 of the leading vehicle 80.

In block 340 of process 300, the processor 30 may monitor or track the geometric shapes 84, 88 of the leading vehicle 80 for a predefined or predetermined condition indicative of the leading vehicle 80 moving to avoid a roadway obstacle. This may occur during each engine ignition sequence; or at least when object vehicle 12 is operating in the autonomous steering mode.

In at least one example of block 340, the predetermined condition is determined based on the movement of the geometric shapes 84, 88 relative to another object within the sensor's field of view 35. For example, the condition may be a lateral displacement of geometric shapes 84, 88 relative to the roadway 62 (e.g., relative to lines 102, 104, e.g., in a lateral direction). If the lateral displacement is greater than a predetermined threshold stored in memory 32, then the condition may be determined or identified. Furthermore, the condition may include determining a displacement greater than the predetermined threshold with respect to a predetermined period of time or with respect to two or more chronologically- or sequentially-received digital frames. In effect, the predetermined threshold may be associated with a rapid movement of the geometric shapes 84, 88 with respect to lines 102, 104 (e.g., having a velocity and/or acceleration greater than predetermined threshold stored in memory 32). In this manner, the condition may not be determined falsely by the leading vehicle 80 changing lanes in a normal or typical fashion (e.g., for non-emergency reasons; i.e., not taking some evasive action).

Other relative displacements could also be used. For example, the predetermined condition in block 350 could be determined by monitoring the lateral displacement of the geometric shapes 84, 88 relative to a periphery 142 of the digital frame 60 (FIG. 4). Or the condition could be determined by monitoring the displacement of shapes 84, 88 with respect to other geometric shapes within the sensor's field of view 35 (e.g., relative to shapes 106-110 (buildings), shapes 118-134 (parked vehicles), etc.).

In block 350, which follows the block 340, processor 30 determines whether the predetermined condition exists. When the condition exists, the process 300 proceeds to block 360; and when the condition does not exist, the processor 30 may loop back and continue to monitor (block 340).

Additional criteria may be required to determine the condition in block 350. For example, the geometric shapes 84, 88 may be required to move together; else the processor 30 may detect a mapping error. In another example, the relative size of the geometric shapes 84, 88 may be used as a criterion; e.g., the condition may be determined based on the lateral displacement (according to the predetermined threshold) and an increase in the relative size of the geometric shapes 84, 88. For example, it should be appreciated that from the point of view of the sensor 22, the geometric shapes 84, 88 mapped to leading vehicle 80 would appear to get larger with respect to the periphery 142 of the digital frame 60 when vehicle 80 is closer to the sensor 22 (and consequently object vehicle 12). This may occur when the leading vehicle 80 is slowing down, which often may be accompanied by the vehicle 80 swerving to avoid an obstacle in the roadway 62. Moreover, determining the condition may be based on a rate of change of the relative size of the geometric shapes 84, 88 being larger than another predetermined threshold—e.g., indicating a rapid deceleration of vehicle 80. The processor 30 may determine other suitable criteria instead of or in addition to these criteria when determining whether the condition of block 350 exists; these are merely examples.

Figure 5:
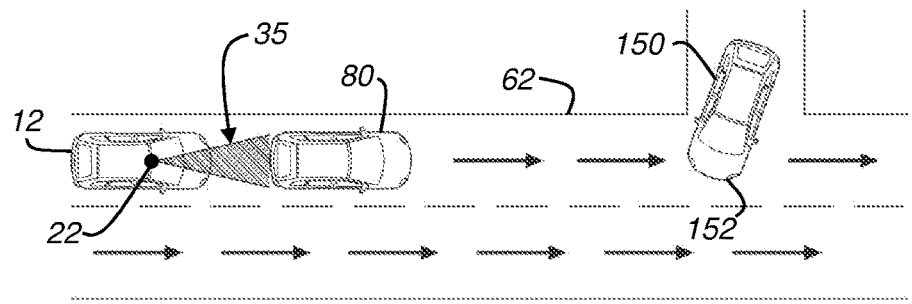
FIGS. 5-8 illustrate a sequence of diagrams showing the vehicle moving to avoid a roadway obstacle according to an exemplary example.
Figure 6:
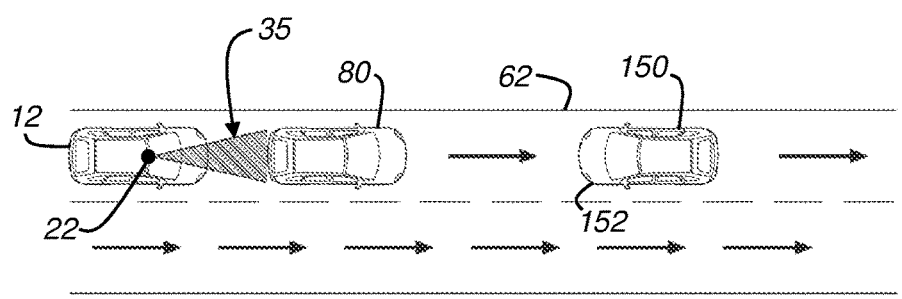

FIG. 5 illustrates blocks 340 and 350. In the illustration, the object vehicle 12 is following the leading vehicle 80 and monitoring for the predetermined condition. Each time the processor 30 determines the condition to not exist (block 350), the processor continues to monitor (looping back and repeating block 340). FIG. 5 also illustrates a roadway obstacle 150 (e.g., a third vehicle) that is not detected by sensor 22 because vehicle 80 at least partially obstructs the sensor's field of view 35 (e.g., the leading vehicle 80 subtends a portion of the sensor's field of view 35 which would otherwise include the third vehicle 150). While the obstacle 150 is illustrated as another vehicle, it should be appreciated that other obstacles are also contemplated (e.g., including but not limited to pedestrians, potholes, objects falling into roadway 62). In this depiction and also FIG. 6, vehicle 150 is traveling the wrong way on a one-way portion of roadway 62. In at least one example, no other sensor at this time on the object vehicle 12 detects vehicle 150.

Figure 7:
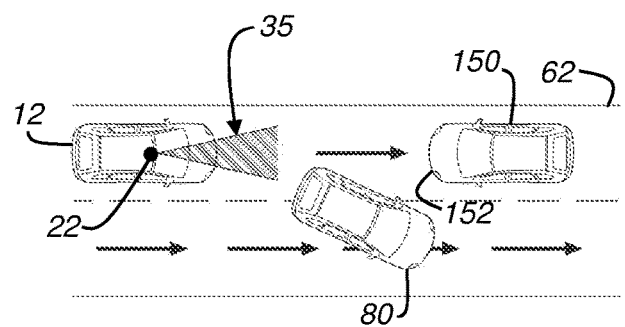
Figure 8:
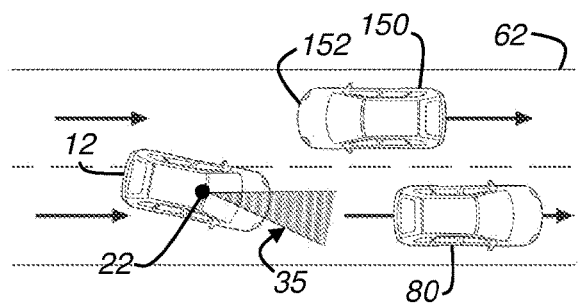

Blocks 340-350 continue as the leading vehicle 80 in FIG. 7 suddenly swerves to avoid a head-on collision with the vehicle 150. The processor 30 receives image data from the sensor 22, and based on the previous mapping block (330), the processor 30 determines that the geometric shapes are laterally displacing in accordance with the predetermined condition. For the first time, vehicle 150 may be detected by sensor 22 of object vehicle 12. Note that the condition may be determined before the entirety of the obstacle 150 (e.g., a front end 152 of the third vehicle) enters the sensor's field of view 35. Further, the predetermined condition may be determined independent of processor 30 (or any other subsystem on object vehicle 12) identifying the roadway obstacle 150 as a hazard and/or determining and executing a collision avoidance maneuver.

Upon determining the existence of the predetermined condition, the processor 30 in block 360 provides or transmits a steering or steering control instruction to the steering system 16, which when received by the system 16, causes the steering system to avoid the third vehicle 150. The instruction triggers the steering system 16 to follow a path of the leading vehicle 80. The instruction may be sent to other vehicle 12 systems as well—e.g., including a vehicle 12 braking system or the like. While the object vehicle 12 is being operated in the autonomous steering mode, computational time at computer 20 can be conserved by following the path of the leading vehicle 80 based on an assumption that the leading vehicle 80 would not swerve in such a manner unless the leading vehicle 80 were swerving to avoid an obstacle, such as obstacle 150. Thus, rather than independently determining a different path at the processor 30 or other vehicle system, the object vehicle 12 may be programmed to avoid a collision with vehicle 150 by imitating the behavior of the leading vehicle 80 which it previously determines to be taking evasive action.

Following block 360, the process 300 ends.

Other examples also exist. For example, in process 300, the computer 20 may provide the instruction (e.g., in block 360) based at least in part on determining at least one other condition using the image data (see block 370 in FIG. 3). For example, computer 20 may determine a second condition: that the leading vehicle 80 is not signaling during or just prior to determining the condition of the lateral displacement being greater than a threshold (block 350)—e.g., using the image data from sensor 22, computer 20 may determine an absence of an indicator signal actuation at the leading vehicle 80 prior to or during the determination by computer 20 of the leading vehicle 80 moving to avoid the roadway obstacle 150. By determining that both a lateral movement greater than a threshold and the absence of the leading vehicle's turning indication, the computer 20 may determine to follow the path of the leading vehicle 80 with a greater confidence factor. Thus, in at least one example, the steering instruction is provided in response to the computer determining multiple conditions (blocks 350, 370). In this example, if at least one other condition does not exist, then computer 20 may continue monitoring the geometric shapes (e.g., looping back to process block 340).

According to another example, computer 20 receives positioning information from a vehicle 12 navigation system (e.g., providing global positioning data), and computer 20 uses that information to determine whether a current portion of the roadway is straight or curved. For example, this information may be used by computer 20 in block 340 when monitoring the geometric shapes for the condition in block 350. For example, when the vehicle 12 is on a straight portion of roadway, some smaller, rapid lateral movements or displacements may be indicative of the leading vehicle 80 moving to avoid a collision (e.g., because the leading vehicle 80 is not expected to displace much laterally toward another region of roadway). Some of these smaller lateral movements however may not be indicative of the leading vehicle 80 moving to avoid a collision—e.g., the leading vehicle 80 moves in a lateral direction because the roadway curves or bends. Thus, by knowing these straight or curved roadway characteristics, computer 20 may minimize a number of false displacement determinations (e.g., lateral movements which are not made by the leading vehicle 80 in order to avoid a collision, but to instead follow the curves in the roadway). Thus, when computer 20 knows that the current portion of roadway bends (e.g., left) and the leading vehicle 80 laterally moves accordingly (e.g., left), this may not trigger the determined condition in block 350. Similarly, if the current portion of roadway bends right, computer 20 detection of a small lateral movement of the leading vehicle 80 to the left, this may be indicative of a movement to avoid a collision with a roadway obstacle (thereby determining the condition in block 350).

Thus, there has been described a collision avoidance system for a vehicle that includes an onboard computer having a processor and memory, wherein the computer is programmed to receive image data from a sensor, associate geometric shape(s) with an image of a leading vehicle within the image data, and, using the geometric shape(s), provide a steering or control instruction when the processor determines that the leading vehicle is moving to avoid a roadway obstacle.

In general, the computing systems and/or devices described may employ any of a number of computer operating systems, including, but by no means limited to, versions and/or varieties of the Ford SYNC® application, AppLink/Smart Device Link middleware, the Microsoft® Automotive operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

With regard to the media, processes, systems, methods, etc. described herein, it should be understood that, although the blocks of such processes, etc. have been described as occurring according to a certain ordered sequence, such processes could be practiced with the described blocks performed in an order other than the order described herein. It further should be understood that certain blocks could be performed simultaneously, that other blocks could be added, or that certain blocks described herein could be omitted. In other words, the descriptions of systems and/or processes herein are provided for the purpose of illustrating certain examples, and should in no way be construed so as to limit the disclosed subject matter.

Accordingly, it is to be understood that the present disclosure, including the above description and the accompanying figures and below claims, is intended to be illustrative and not restrictive. Many examples and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and processes will be incorporated into such future examples. In sum, it should be understood that the disclosed subject matter is capable of modification and variation.

What is claimed is:

1. A computer, comprising a processor and memory storing instructions executable by the processor, the instructions comprising, to:
   receive image data from a vehicle sensor;
   associate a plurality of geometric shapes with the image data of a target vehicle;

using the image data, monitor the plurality of geometric shapes for a first condition indicative of the target vehicle moving to avoid a roadway obstacle;

using the image data, monitor for a second condition also indicative of the target vehicle moving to avoid the roadway obstacle; and in response to determining the first and second conditions, provide a steering instruction to avoid the obstacle, wherein the second condition is an absence of an indicator signal actuation at the target vehicle prior to or during the determination of the target vehicle moving to avoid the roadway obstacle.

2. The computer of claim 1, wherein the plurality of geometric shapes include a first geometric shape associated with an upper rear portion of the target vehicle and a second geometric shape associated with a lower rear portion of the target vehicle.

3. The computer of claim 2, wherein at least one of the first and second geometric shapes is a rectangle.

4. The computer of claim 1, further programmed to map at least a portion of each of the plurality of geometric shapes to a peripheral outline of a rear view of the target vehicle.

5. The computer of claim 1, wherein the first condition is associated with a relative displacement of the plurality of geometric shapes within two or more frames of image data.

6. The computer of claim 5, wherein the relative displacement is in a lateral direction.

7. The computer of claim 1, wherein the instructions further comprise to: monitor for the first condition by using global positioning data to determine whether a portion of the roadway is straight or curved, wherein the portion is associated with a region where the target vehicle moved to avoid the roadway obstacle.

8. A process, comprising:
receiving image data of a target vehicle from a sensor;
associating at least two geometric shapes with the image data;
using the image data, monitoring the at least two geometric shapes for a first condition indicative of the target vehicle moving to avoid a roadway obstacle;
using the image data, monitoring for a second condition also indicative of the target vehicle moving to avoid the roadway obstacle; and
in response to determining the first and second conditions, providing a steering instruction to avoid the obstacle,
wherein the second condition comprises an absence of an indicator signal actuation at the target vehicle prior to or during the determination of the target vehicle swerving to avoid the roadway obstacle.

9. The process of claim 8, wherein the at least two geometric shapes include a first geometric shape associated with an upper rear portion of the target vehicle and a second geometric shape associated with a lower rear portion of the target vehicle.

10. The process of claim 9, wherein at least one of the first and second geometric shapes is a rectangle.

11. The process of claim 8, wherein associating further comprises mapping at least a portion of each of the at least two geometric shapes to a peripheral outline of a rear view of the target vehicle.

12. The process of claim 8, wherein the determination of the first condition is associated with a relative displacement of the at least two geometric shapes within two or more frames of image data.

13. The process of claim 12, wherein the relative displacement is in a lateral direction.

14. The process of claim 8, wherein monitoring for the first condition further comprises: using global positioning data, determining whether a portion of the roadway is straight or curved, wherein the portion is associated with a region where the target vehicle moved to avoid the roadway obstacle.

15. A process, comprising:
receiving, in a first vehicle, a plurality of data frames from a sensor in the first vehicle;
determining that a second vehicle is located in front of the first vehicle;
generating a plurality of geometric images associated with a shape of a rear view of the second vehicle, the plurality of geometric images including a first geometric image associated with an upper rear portion of the second vehicle and a second geometric image associated with a lower rear portion thereof;
monitoring the generated first and second geometric images; and
providing a steering control instruction from the processor that causes the first vehicle to follow the second vehicle and also avoid a roadway obstacle when:
(a) the generated first and second geometric images move laterally with respect to another object within the plurality of data frames, and
(b) an absence of an indicator signal actuation is determined when the generated first and second geometric images move laterally,
wherein the steering control instruction is provided independent of the first vehicle identifying the roadway obstacle.

16. The process of claim 15, wherein at least one of the first and second geometric images is a rectangle.

17. The process of claim 15, wherein generating further comprises mapping at least a portion of each of the first and second geometric images to a peripheral outline of a rear view of the second vehicle.

18. The process of claim 15, wherein the steering instruction is provided at least partially in response to the determined absence.

* * * * *